July 15, 1958     D. M. SCHWARTZ     2,843,213
MATERIAL HANDLING MACHINE
Filed Aug. 28, 1953     15 Sheets-Sheet 1
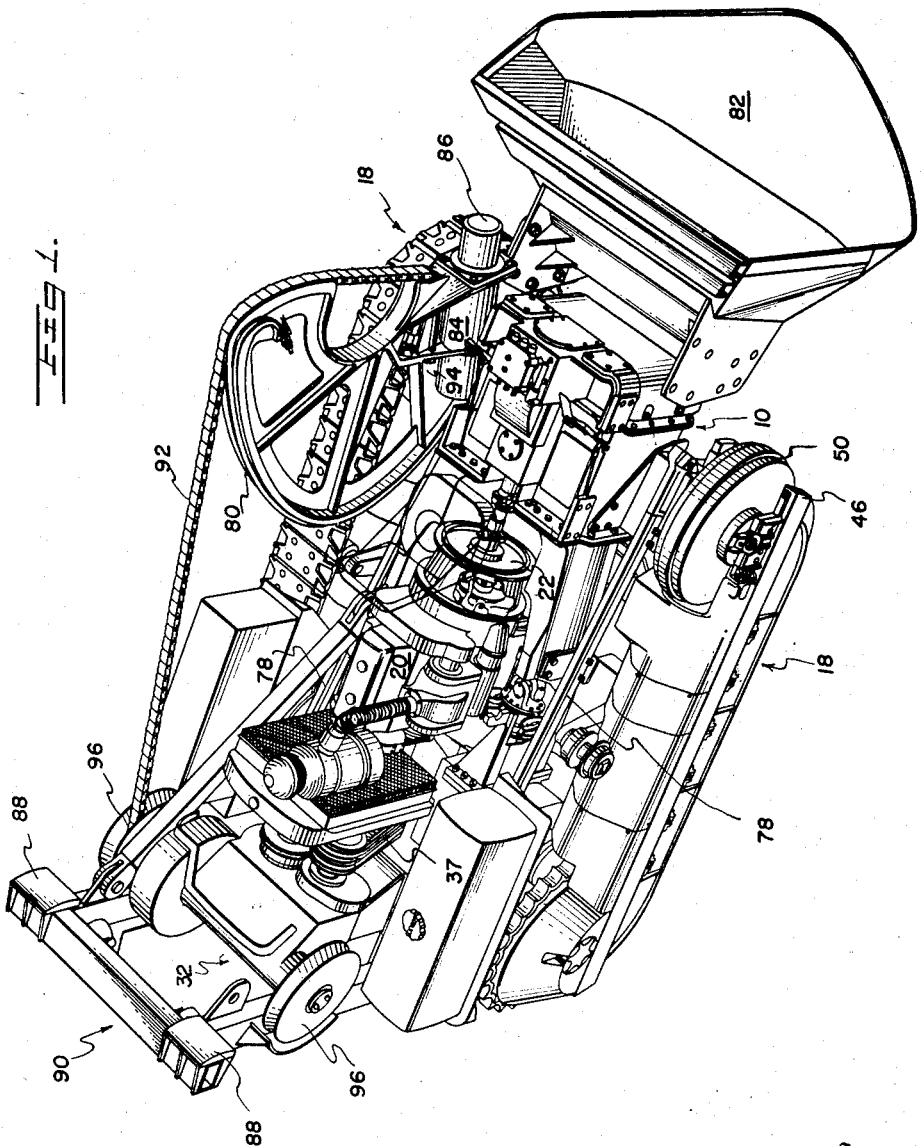
Inventor
DANIEL M. SCHWARTZ,
By Harold T. Stowell
Attorney

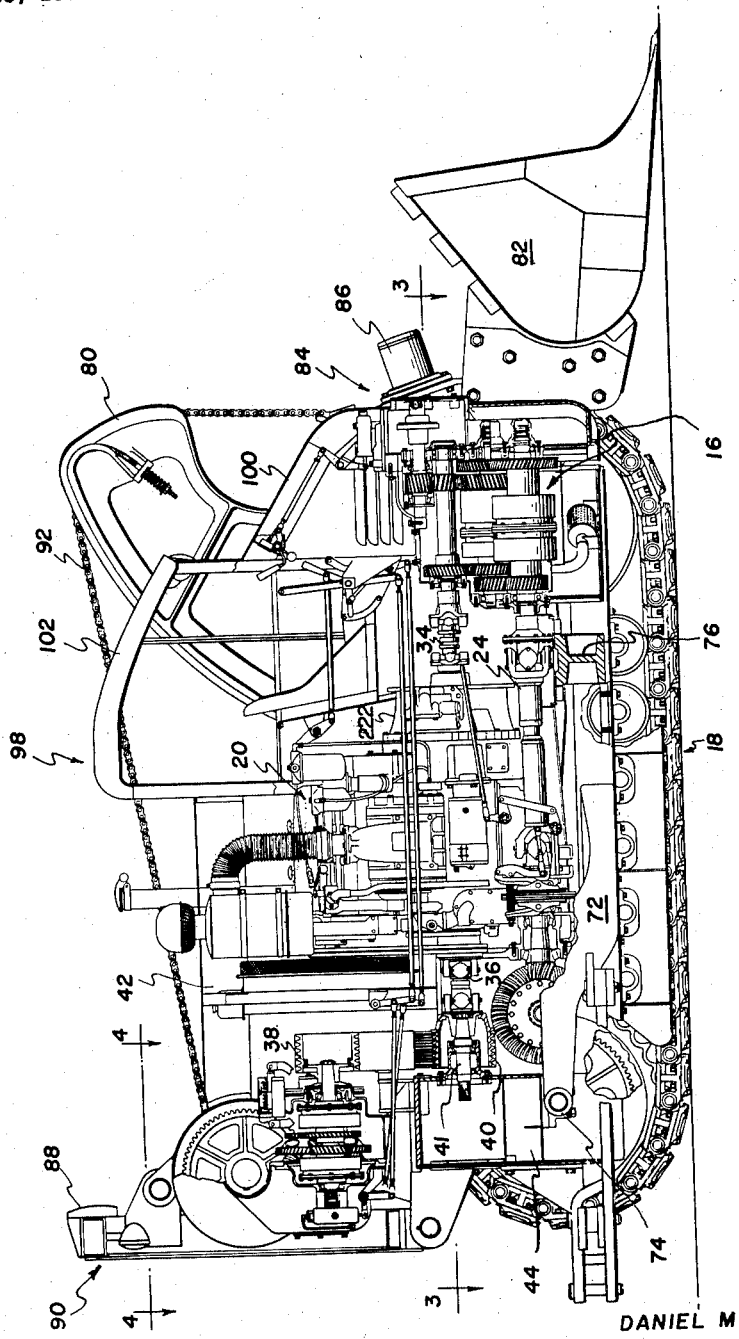

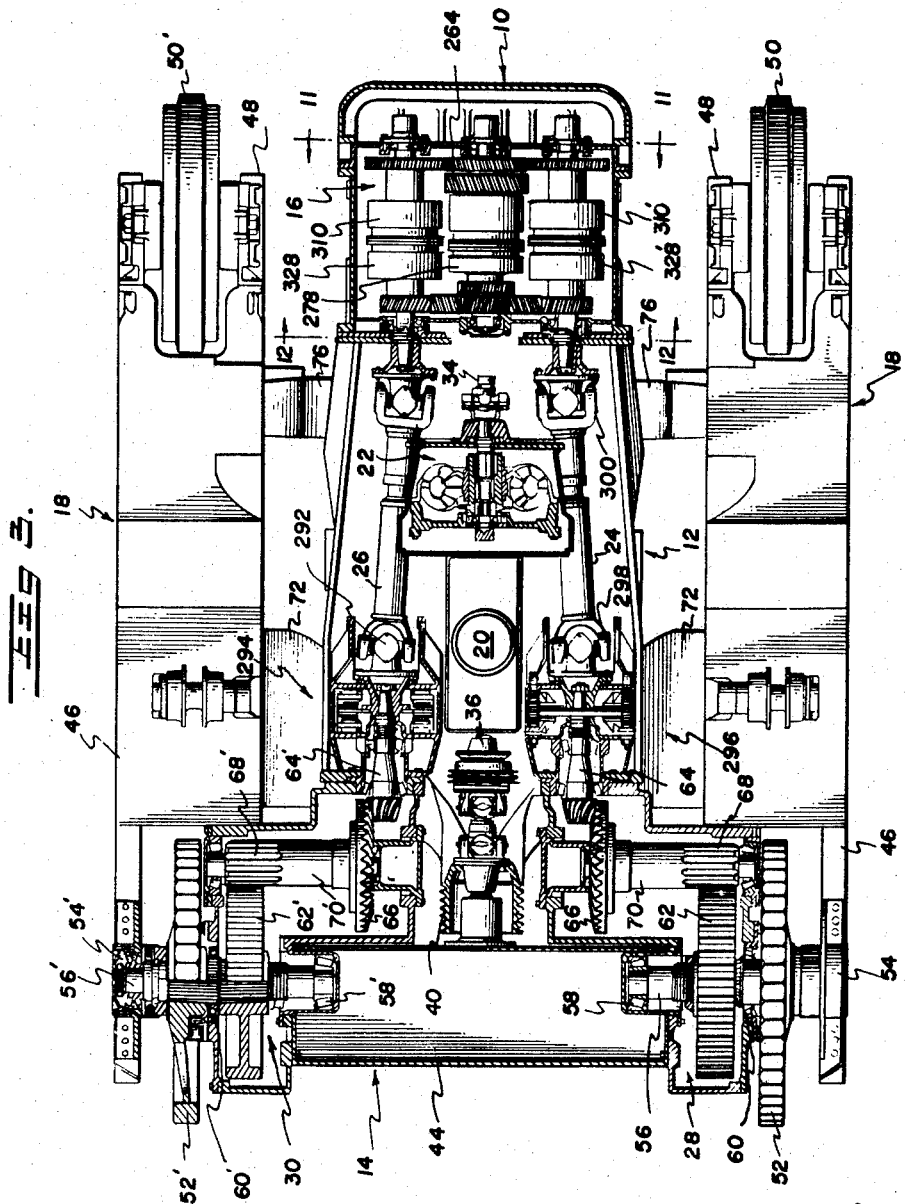

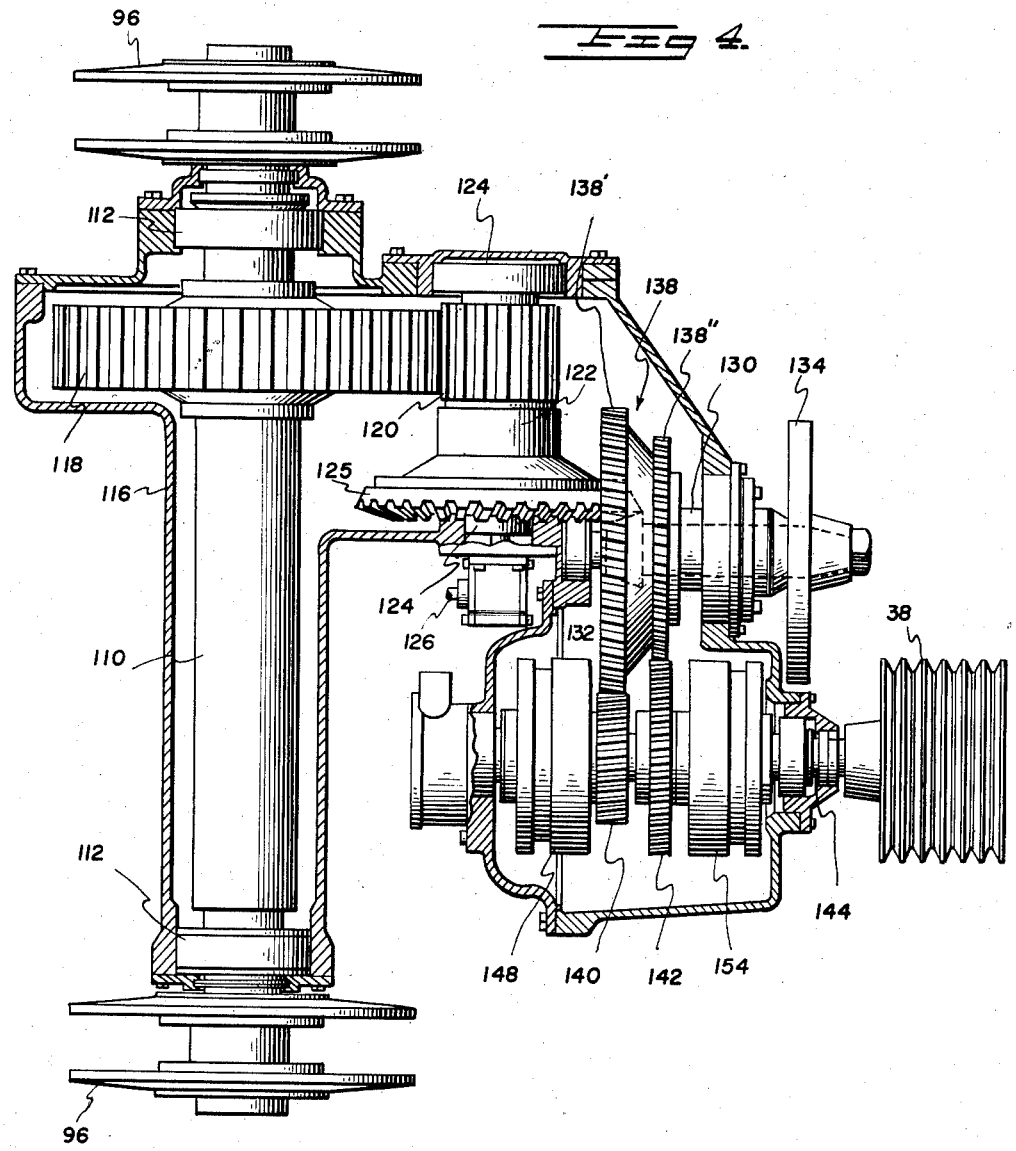

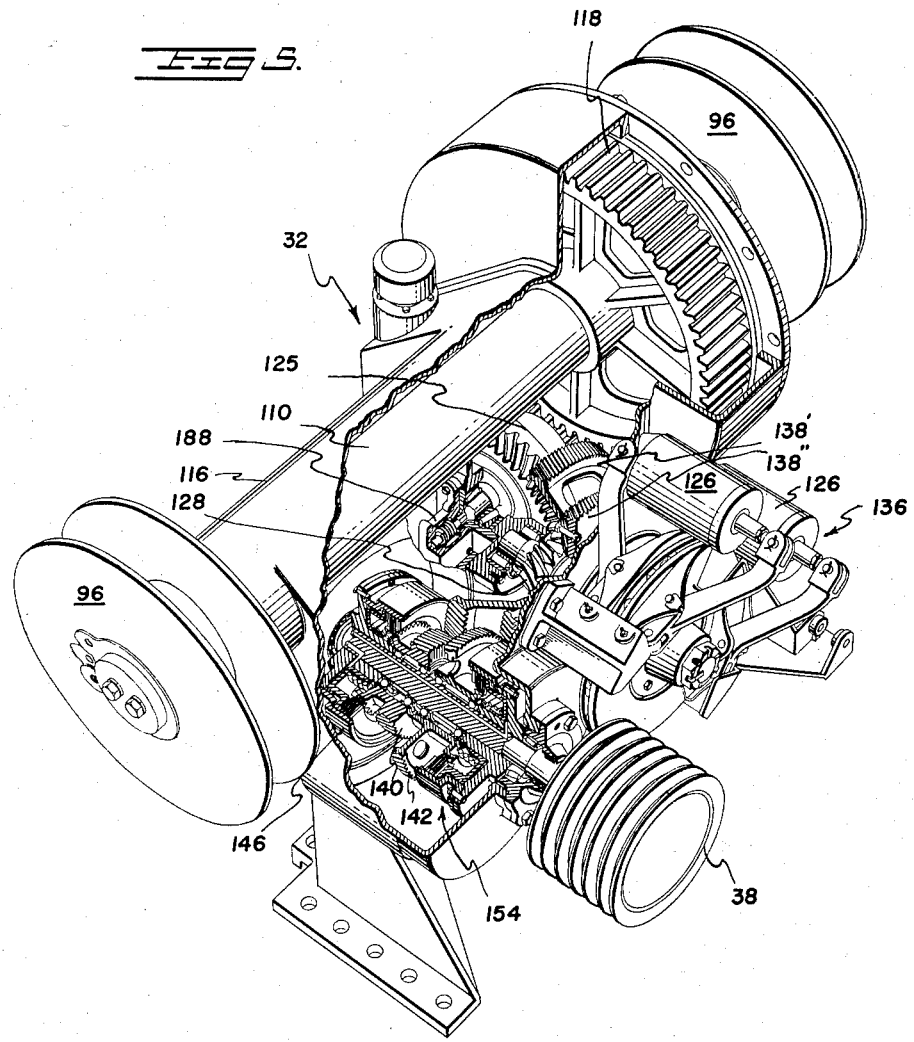

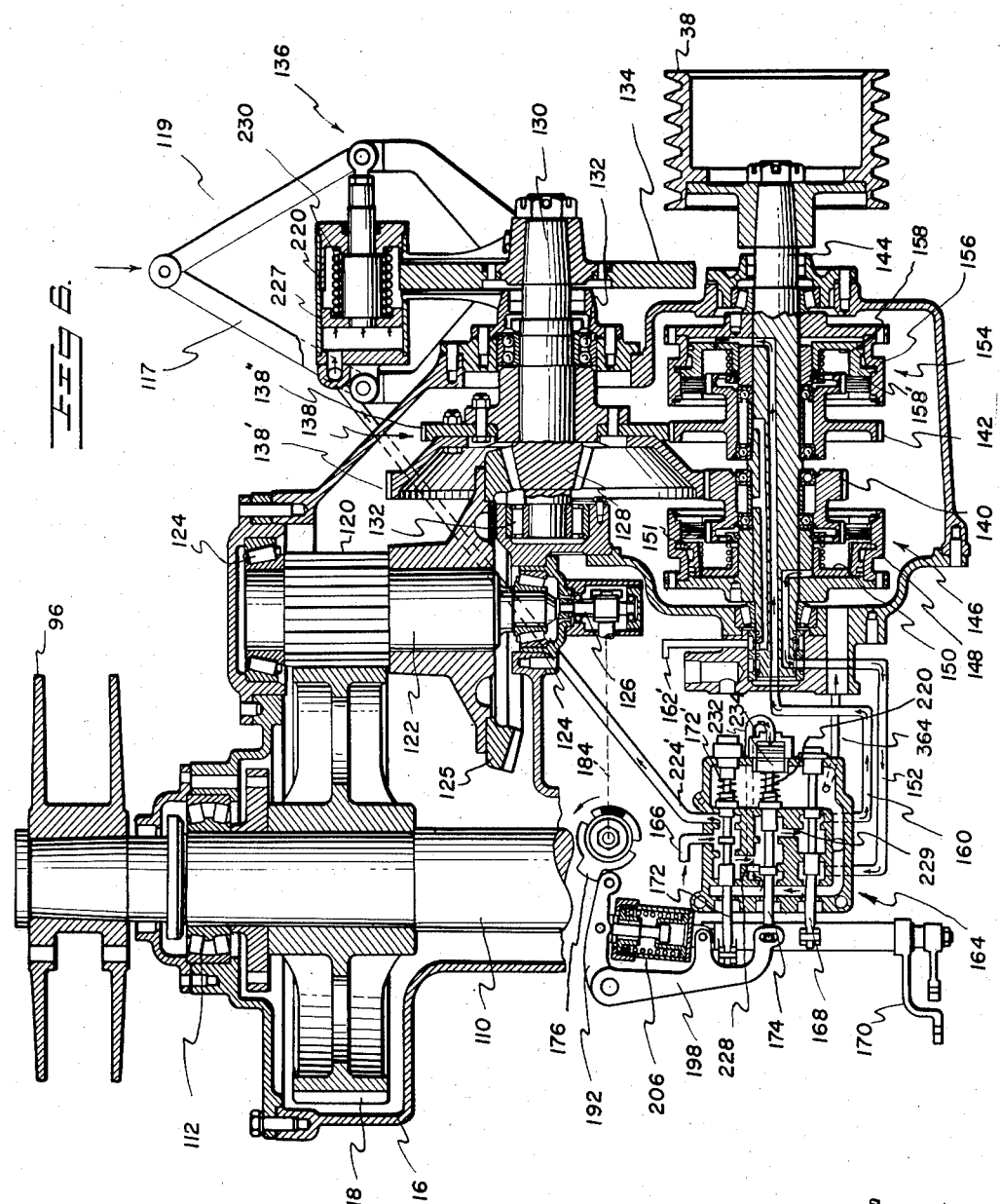

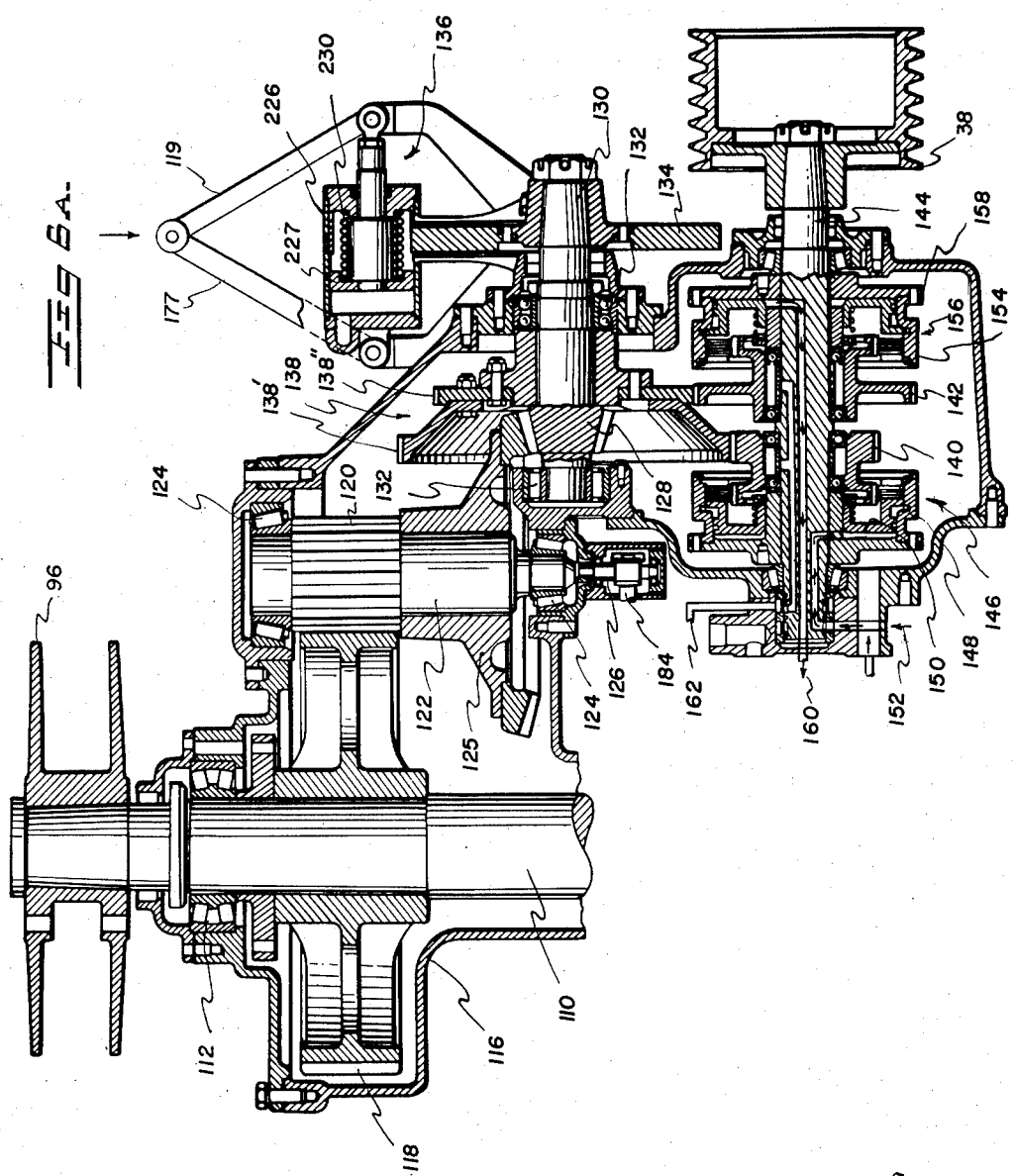

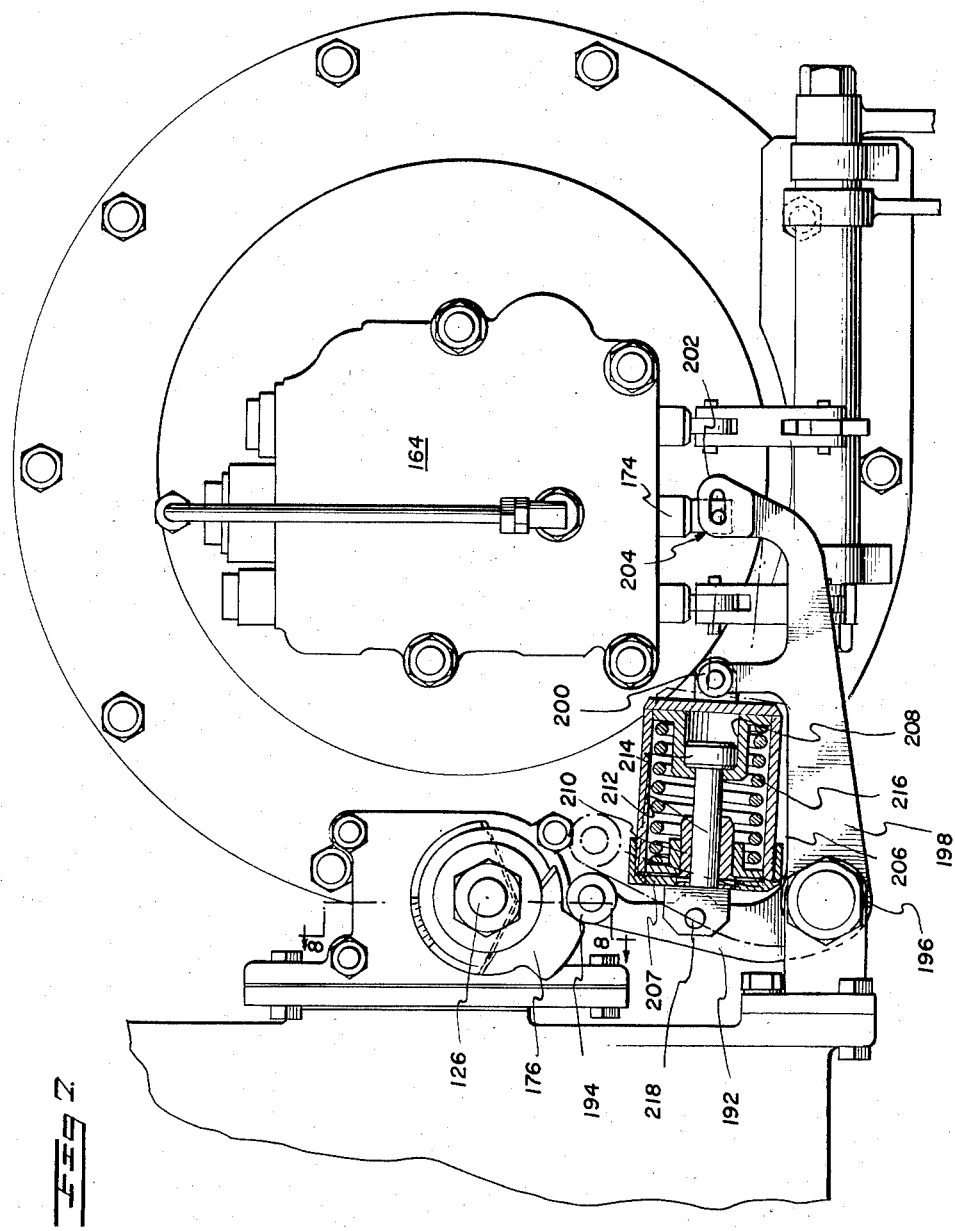

July 15, 1958 D. M. SCHWARTZ 2,843,213
MATERIAL HANDLING MACHINE
Filed Aug. 28, 1953 15 Sheets-Sheet 9

INVENTOR
DANIEL M. SCHWARTZ,
BY Harold T. Stowell
ATTORNEY

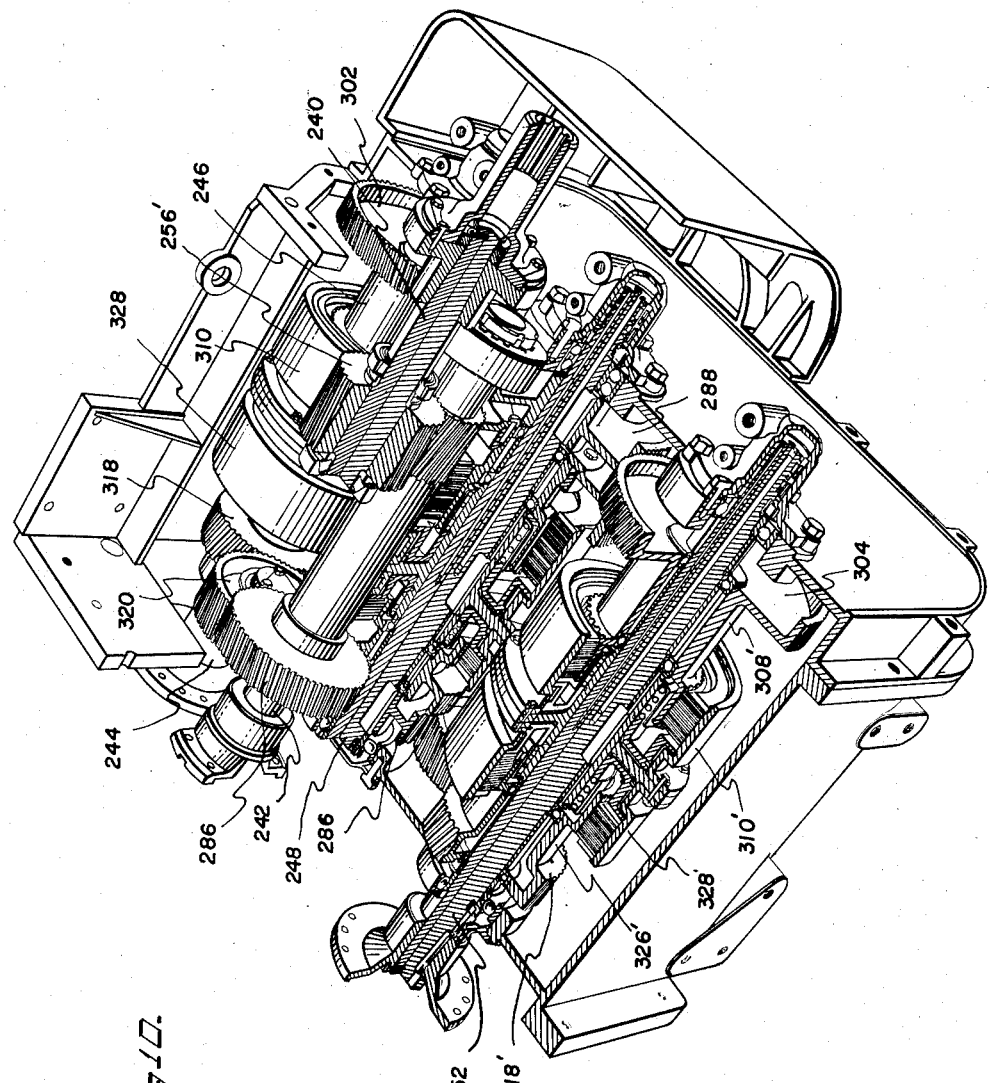

July 15, 1958 D. M. SCHWARTZ 2,843,213
MATERIAL HANDLING MACHINE
Filed Aug. 28, 1953 15 Sheets-Sheet 11
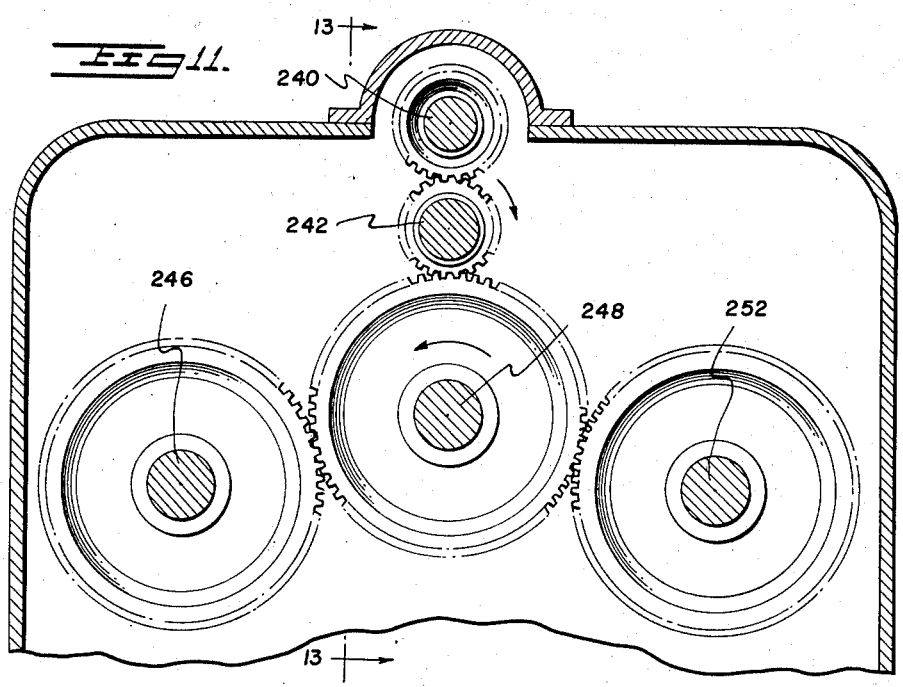
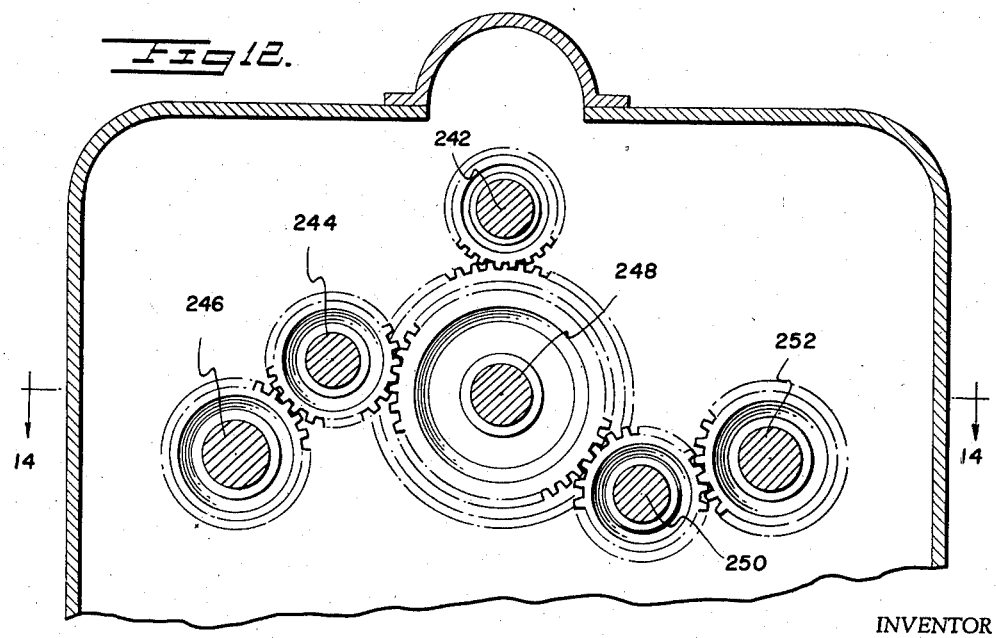
INVENTOR
DANIEL M. SCHWARTZ,
BY Harold T. Stowell
ATTORNEY

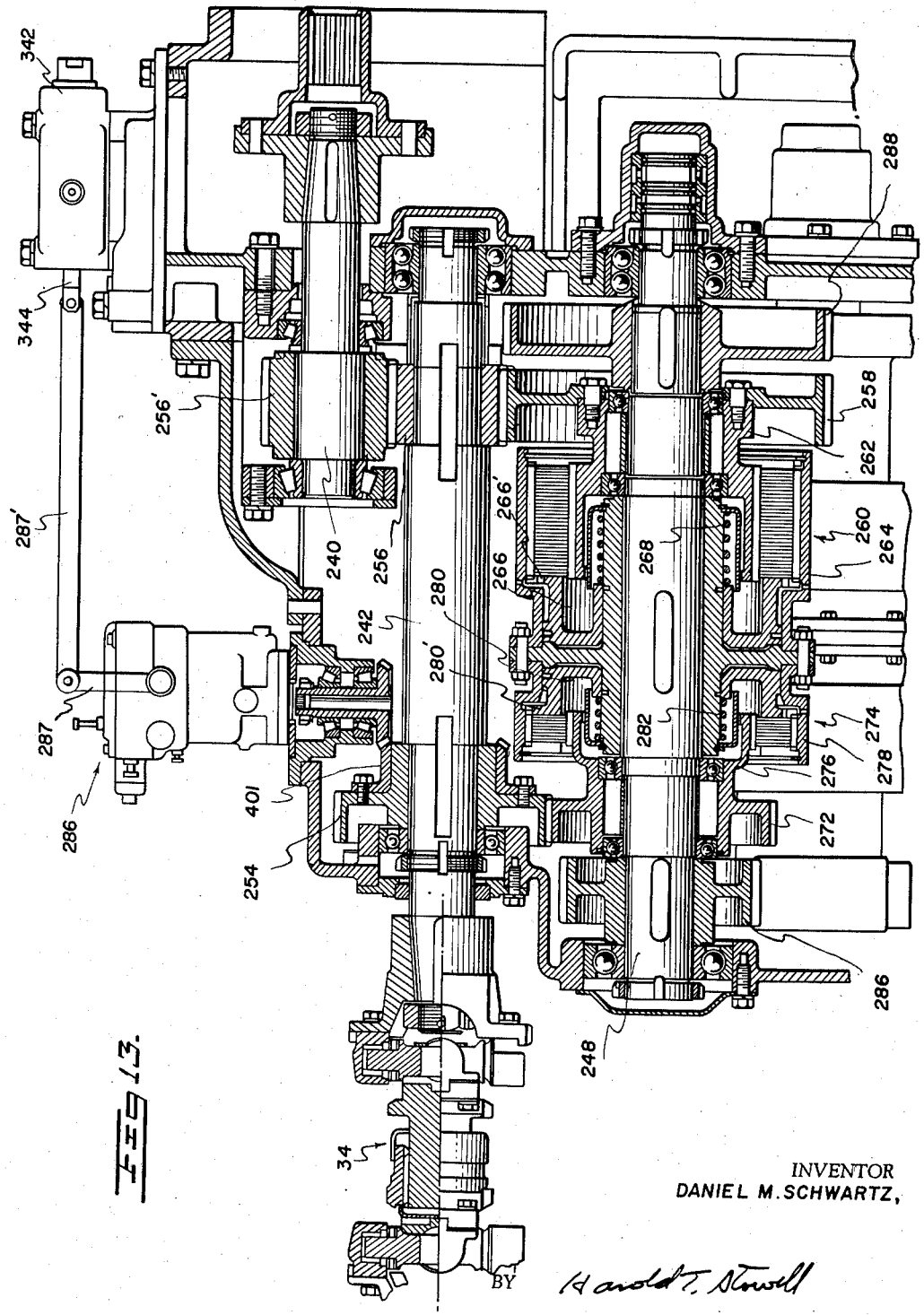

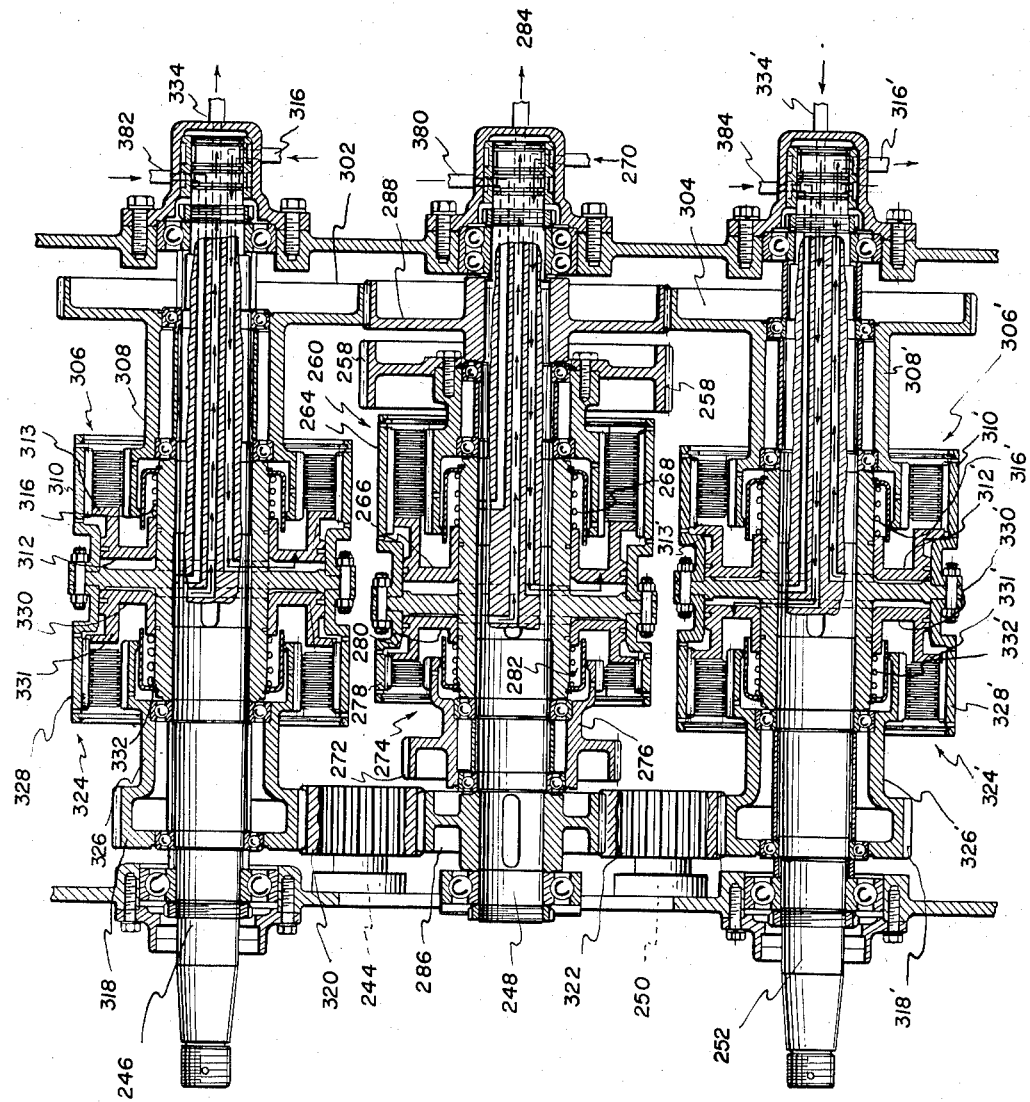

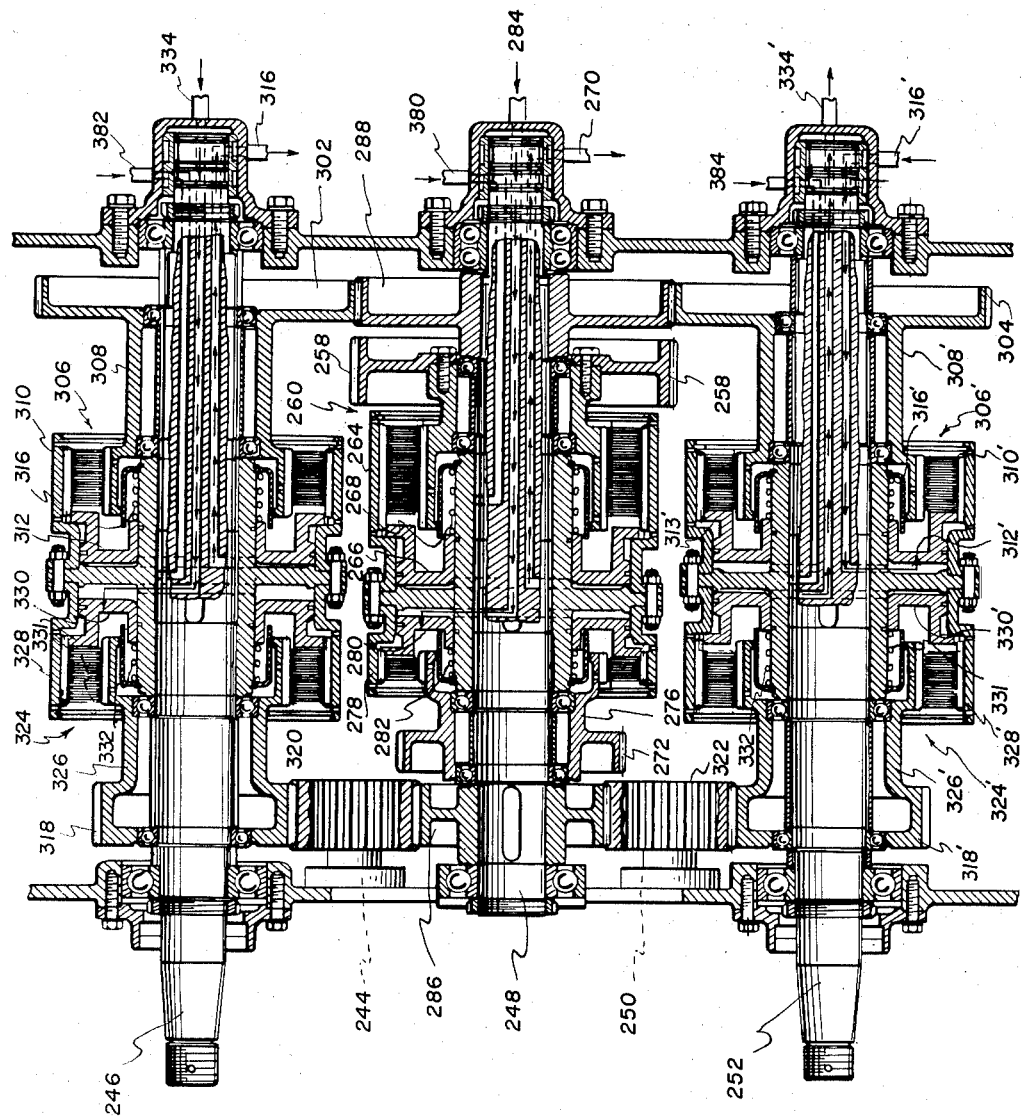

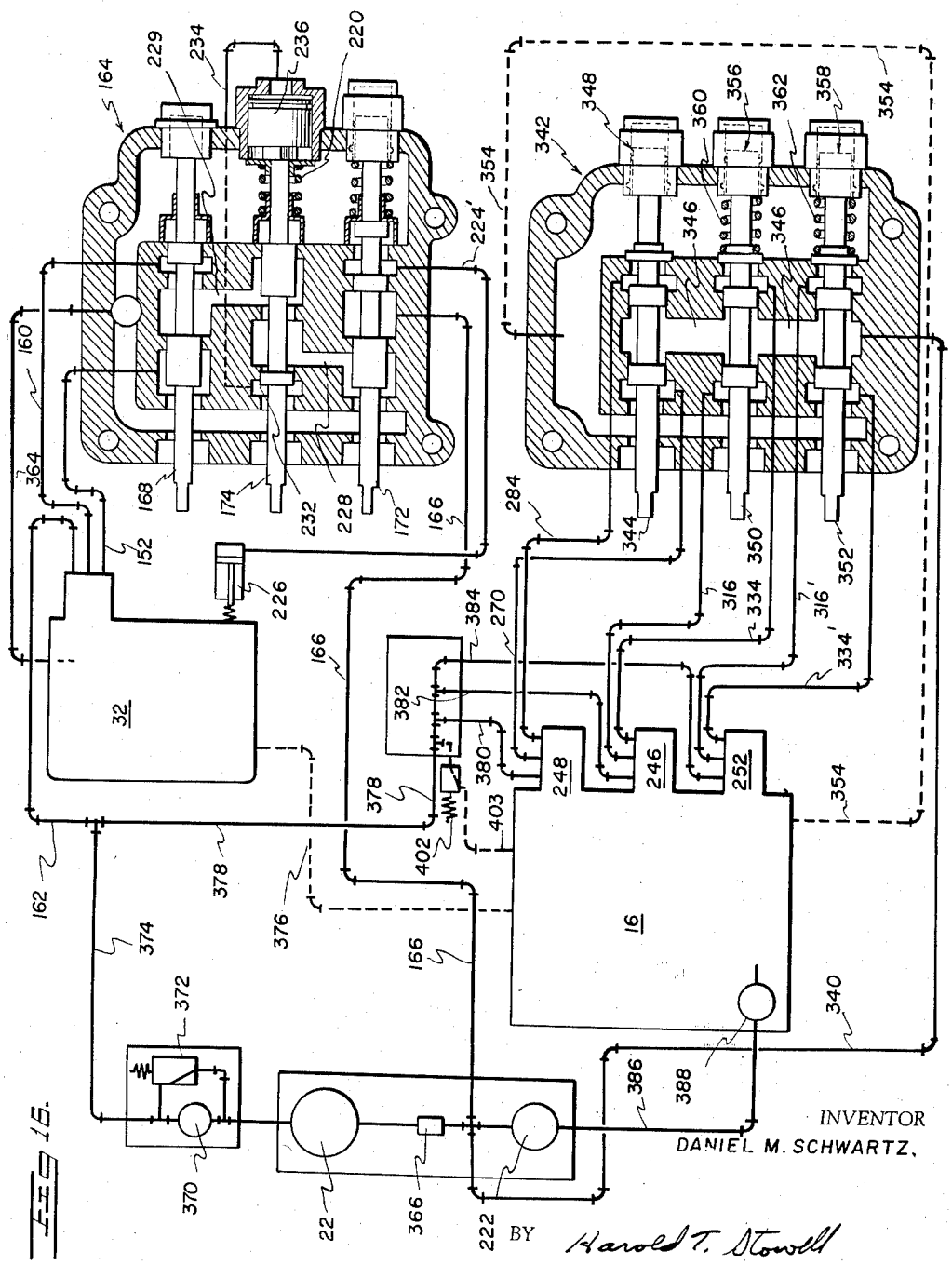

United States Patent Office 2,843,213
Patented July 15, 1958

2,843,213

MATERIAL HANDLING MACHINE

Daniel M. Schwartz, Salt Lake City, Utah, assignor, by mesne assignments, to The Eimco Corporation, Salt Lake City, Utah, a corporation of Delaware Application August 28, 1953, Serial No. 377,125

4 Claims. (Cl. 180—53)

This invention relates to a mobile material handling machine that is characterized by its compactness, mobility and ease of control. The invention will be particularly described with reference to such a machine including an overhead bucket supported on a main frame having individually operated crawlers or self-laying tracks.

It is an object of the invention to provide such a machine having a centrally positioned prime mover, with a rear power take-off connected to a material handling structure actuating mechanism, and a forward power take-off connected to a traction transmission.

A further object is to provide such a machine wherein the signal prime mover supplies pressure fluid for the operation of the novel traction and material handling structure transmissions.

A further object is to provide drive means for such a machine having all of the power transmitting clutches positioned within the power transmission.

Another object is to provide a material handling machine having dual traction unit drives wherein all of the drive clutches and the power division are all located together in the traction unit transmission.

A further object is to provide crawler and bucket transmissions which are of the constant mesh hydraulically controllable type.

Another object is to provide a machine of the class described having improved independently controllable dual axle drive for the ground engaging traction units.

Another object is to provide such a machine wherein the main frame is constructed in three sections, thereby substantially facilitating assembly, repair, and changing of the gauge of the ground engaging traction units.

Another object is to provide such a device having an overhead bucket material handling means wherein the overhead bucket mechanism is automatically disconnected from the power supply and its travel reversed and/or stopped at substantially any predetermined bucket position whereby the discharge distance of the bucket may be readily controlled.

Another object is to provide brake mechanism for the overhead bucket material handling device which is automatically applied and prevents further travel of the bucket when the bucket control lever is released intentionally or accidentally.

A further object is to provide a two-speed drive mechanism for the overhead bucket device whereby extremely high digging force may be obtained in a low gear position, and high speed material discharge may be obtained in the high speed gear position.

Another object is to provide a material handling machine having a centrally positioned prime mover having front and rear power take-off shafts which are driven directly from the prime mover and run constantly with the prime mover regardless of the operation of the bucket and ground engaging traction units.

A further object is to provide such a machine having improved engine cooling means when operated with an internal combustion type prime mover.

These and other objects and advantages of the invention will appear more clearly from the detailed description in conjunction with the illustrative embodiments shown in the accompanying drawings in which:

Fig. 1 is a right front perspective view of the overhead material handling machine of the invention with the cab and the motor, and transmission covers, and one of the rocker arms removed;

Fig. 2 is a side elevation in partial section of the loader of Fig. 1;

Fig. 3 is a section substantially on line 3—3 of Fig. 2 with portions broken away for clarity;

Fig. 4 is an enlarged fragmentary section on line 4—4 of Fig. 2 with portions broken away for clarity;

Fig. 5 is an enlarged detailed perspective view in partial section of the overhead bucket drive mechanism;

Fig. 6 is a view similar to that shown in Fig. 4 in partial section with the control valve and cam actuating mechanism therefor rotated 90°;

Fig. 6a is a view similar to that shown in Fig. 6 with the drive clutches in the bucket-up low speed position;

Fig. 7 is an enlarged detailed view in partial section of the bucket power cut-off mechanism;

Fig. 10 is an enlarged perspective view in partial section of crawler drive transmission;

Fig. 11 is a section substantially on line 11—11 of Fig. 3 showing the shaft layout of the crawler drive transmission;

Fig. 12 is a section substantially on line 12—12 of Fig. 3 showing the rear shaft layout of the crawler drive transmission;

Fig. 13 is a fragmentary section substantially on line 13—13 of Fig. 11;

Fig. 14 is a section on line 14—14 of Fig. 12 with portions broken away for clarity showing the transmission in low speed drive position;

Fig. 15 is a view similar to Fig. 14 with the drive in high speed reverse drive position; and Fig. 16 is a diagrammatic representation of the hydraulic system of the material handling machine.

Figure 8:
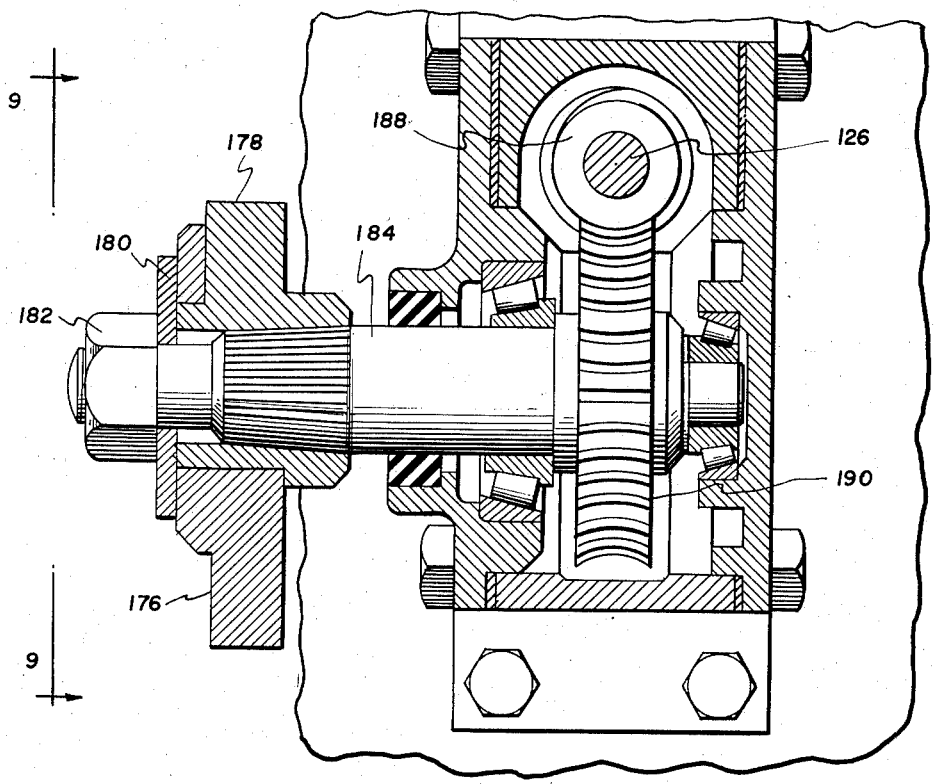
Fig. 8 is an enlarged fragmentary sectional view substantially on line 8—8 of Fig. 7.

With particular reference to Figs. 1 through 3 of the drawings, there is shown a material handling apparatus generally embodying the principles of the invention. While the material handling machine shown in the drawings and described hereinafter has an overhead material handling superstructure and endless chain type traction units, it will be evident that other forms of traction units such as wheels could be used and that other types of material handling devices could be carried by the machine without loss of all of the objects and advantages of this invention. The machine has a main frame consisting of three individual and separable sections comprising a forward section 10, a center section 12 and a rear section 14.

The forward section 10 carries the constant mesh hydraulically actuated transmission 16 for the rear drive, endless track type traction units 18.

The center section 12 carries a single prime mover 20, centrally positioned therein, a hydraulic torque converter 22, and a pair of torque shafts designated 24 and 26 which are positioned on either side of the prime mover 20.

The rear section 14 carries the opposed dual drives 28 and 30 for the individually operated crawlers in the lower section and an overhead bucket actuating mechanism including a constant mesh hydraulically actuated bucket transmission generally designated 32, positioned above the dual drives 28 and 30.

The forward transmission, as to be more fully described hereinafter, is connected to the prime mover through a universal coupling 34 to the torque converter 22, while the rear or bucket transmission 32 is connected to the same prime mover by means of a rearwardly extending power take-off 36, belts 37 and belt sheaves 38 and 40. A rear power take-off shaft 41 extends rearwardly from shaft 36 and rotates with sheave 40.

On installations where the prime mover is of the diesel or Otto cycle internal combustion type, a coolant heat exchanger 42 for the engine is positioned between the rearward extremity of the engine and the forward extension of the bucket transmission.

As more clearly shown in Fig. 5, the bucket drive mechanism and transmission is in itself a separate unit which merely bolts to the rear section of the main frame. It will also be seen that the crawler drives 28 and 30 are each separate units which are bolted to a spacer frame 44 to form the lower portion of the rear section 14.

Each of the endless track units 18 comprises a pair of spaced side channel members 46 and 48 connected in spaced relation by transverse top plates and ribs. The top plates are notched at their front and rear ends to provide clearance for the front idler wheels 50 and 50' and the driven sprocket wheels 52 and 52', respectively.

The outer side channel members 46 are of a greater length than and extend rearwardly of the corresponding inner channel members 48. Secured to these rearward extensions of the outboard channel members are self-aligning roller bearing units 54 and 54'. The inner bearing races of the units are carried by the line axle shafts 56 and 56' of each drive unit.

Axle 56 is journalled to the right rear drive housing by means of inboard and outboard bearings 58 and 60. Also secured to the axle are sprocket wheel 52 and gear 62. The axle, sprocket and gear are driven, as to be more fully described hereinafter, through pinion 64 and gears 66 and 68 on the intermediate shaft 70.

The support for axle 56' and the drive means therefor are identical to those for the right hand axle 56 and corresponding elements have been given primed reference numerals.

Each track frame unit is provided with a generally rearwardly extending diagonal brace member 72. The forward ends of the braces are secured, preferably by welding, to their corresponding inner track channel members 48, forwardly of the bearing members 54 and 54' on the complementary outer channel members.

The rearward ends of the diagonal braces 72 are each pivotally connected to the under side of the spacer frame 44 so that the track units are free to pivot about the main frame with the outboard ends of live axles 56 and 56' forming one of the pivot points and bearing 74, on center with the axles, forming the other pivot point.

The forward end of the main frame is supported by an equalizer bar 76, which bar is mounted at its center on the center section of the main frame 12. The ends of the bar are in engagement with their respective track frames.

It will be apparent from the foregoing description of the main and track frames that by constructing the track frames as separate units from the main frame, and by constructing the main frame from a plurality of independent sections, the initial construction costs, assembly, maintenance and repair of the material handling machine are substantially reduced. It will further be evident with this type of construction machines having various track widths may be economically constructed from a minimum of tractor parts. For example, a material handling machine having a wider or narrower track gauge may be constructed from the machine shown in Fig. 3 without modification of the track frames 18, or the forward section 10, and the center section 12 of the main frame. The smaller or larger sections required are merely the spacer frame 44, final drives 28 and 30 and diagonal brace members 72.

It is also evident that a change of gauge could be readily made in the field by merely attaching the main frame sections 10 and 12 and the bucket transmission section 32 to a modified rear section 14 and track frames.

Other substantial advantages of this form of construction will be evident from the following description of the drive mechanisms and the overhead bucket structure, for example, a substantial increase in operator visibility and a substantial increase in the protection of the prime mover and its cooling system is obtained by their central location.

It has further been found that on the present machine the central location of the engine and its cooling system permits use of the machine under extreme conditions such as loading and unloading hot open hearth furnaces, and on very rough ground, without overheating or placing undue strains on the engine. In the conventional material handling tractors with the engine in the forward section, it is cantilevered forward from the main frame and any impacts or shocks in the tractor have the result of causing deflections in the engine and its supports.

As more clearly shown in Figs. 1 and 2, the main frame of the material handling machine supports an overhead bucket assembly upon parallel tracks or rails 78 secured along each side of the main frame.

The overhead bucket structure is of the overhead rocker type. The side frames 80, only one of which is shown in the drawings, of the rocker structure have curved outer surfaces for rolling engagement with the parallel rails 78, the radius of curvature of the surfaces generally increasing from the forward to the rearward ends of the curved sections.

Between the lower ends of the curved rocker arms is supported a shovel bucket 82 and each arm is also provided with a shock absorbing bumper member 84 having a spring loaded piston 86 slidably mounted therein. Each piston contacts a corresponding plate 88 secured to a rigid bumper frame 90 mounted at the rear end of the main frame when the bucket is in the dumping position.

Flat cable chains 92, one for each rocker arm, are attached at one end to the rocker arms, as at 94, just above the bumper members 84 and the other ends are secured to their respective bucket reels 96 of the bucket transmission assembly 32. Rotation of the reels 96 raises the bucket from its forward low digging position as the rocker arms roll rearwardly along tracks 78 to an upward and rearward discharge position.

A control cab 98, as shown in Fig. 2, is positioned on the center line of the main frame between the prime mover and the forward transmission 16 with the operator's seat facing forward whereby the operator may conveniently observe the digging and crowding action of the bucket. A forward housing section 100 for the forward section 10 of the machine is sloped generally downwardly to provide a clear line of vision for the operator over the front end of the machine and the upper edge of the shovel bucket 82 in its forward loading and crowding position. Thus the operator has at all times an unobstructed view of the material to be excavated.

When the machine, as shown in the drawings, is employed with an overhead bucket mechanism the top 102 of the cab and the front housing section 100 are shaped to clear the path of the bucket as it travels to the rear.

The bucket transmission 32 will be described with reference to Figs. 4, 5, 6, 6a, 7, 8 and 16.

The bucket reels 96 are keyed to the outer ends of cross shaft 110 which shaft is journalled for rotation in bearings 112 carried by the transmission housing 116. Also keyed to the cross shaft is a large gear wheel 118. The gear 118 is in driving relation to gear 120 on the intermediate shaft 122. The intermediate shaft 122 is journalled in bearings 124 carried by the housing 116. Also rotatable with the intermediate shaft 122 is a bevel gear 125 and a stub shaft 126; the function of the latter shaft will be described with reference to the novel power cut-off mechanism of the invention. A pinion gear 128 on shaft 130 engages the bevel gear 125. The pinion shaft is journalled in bearings 132 carried by the housing 116. Keyed to the forward end of the pinion shaft 130 is a brake disc 134 of a brake assembly generally designated 136.

A compound gear 138 having two sets of gear teeth 138' and 138" is keyed to the pinion shaft 130 between the shaft support bearings 132. Gear teeth 138' are in constant mesh with the gear teeth of gear 140 and gear teeth 138" are in constant mesh with the gear teeth of gear 142.

Gears 140 and 142 are rotatably mounted on shaft 144, to the forward end of which is keyed the belt drum 38 hereinbefore described.

Alternate radially extending clutch discs of multiple disc clutch 146 are secured to and rotate with gear 140. The other discs of clutch 146 are secured to the clutch housing 148, which housing is keyed to and rotates with shaft 144. Within the clutch housing is a ring shaped piston 150, spring urged out of engagement with the clutch discs. The rear portion 151 of the piston forms a presser plate for the clutch discs.

Pressure fluid is directed to the head of piston 150 through a conduit 152, a portion of which is provided by an internal passage in the shaft 144. If pressure fluid is directed into conduit 152 in the direction of the arrows in Fig. 6a the piston 150 urges the discs of clutch 146 into engagement so that gear 140 will rotate with the clutch housing 148 which is attached to shaft 144.

Alternate radially extending clutch discs of multiple disc clutch 154 are secured to and rotate with gear 142. The other discs of clutch 154 are secured to the clutch housing 156, which housing is keyed to and rotates with shaft 144. Within the clutch housing 156 is a ring shaped piston 158 spring urged out of engagement with the clutch discs. The rear portion 158' of the piston forms a presser plate for clutch discs.

Pressure fluid is directed to the head of piston 158 through conduit 160, a portion of which is provided by an internal passage in the shaft 144. If pressure fluid is directed into conduit 160 in the direction of the arrows in Fig. 6, the piston 158 urges the discs of clutch 154 into engagement so that gear 142 will rotate with the clutch housing 156 attached to shaft 144.

A third conduit 162, a portion of which is provided by an internal passage in the shaft 144, supplies lubrication for the clutches, bearings and gears of the assembly. A pressure fluid return line 364 connects the valve 164 and the transmission housing 32. The lubricating oil and the pressure fluid are drained from the lowermost portion of the transmission housing by return line 376 shown in Fig. 16 and to be more fully described hereinafter.

Conduits 152 and 160 are connected to a three spool pressure fluid control valve 164. The valve 164 is connected to a source of pressure fluid, as to be more fully described hereinafter, through conduit 166.

Spool 168 of the valve is the high-speed low-speed selector spool and is manually controlled by the machine operator through suitable control levers, a portion of which is shown at 170. Valve spool 172 is a three position spool having a bucket hold center position, as shown in Fig. 16, a bucket up position as shown in Fig. 6 and a bucket down position when the spool is in its most inwardly position. Valve spool 174 is a two position spool which is automatically actuated by the bucket power cut-off mechanism.

Figure 9:
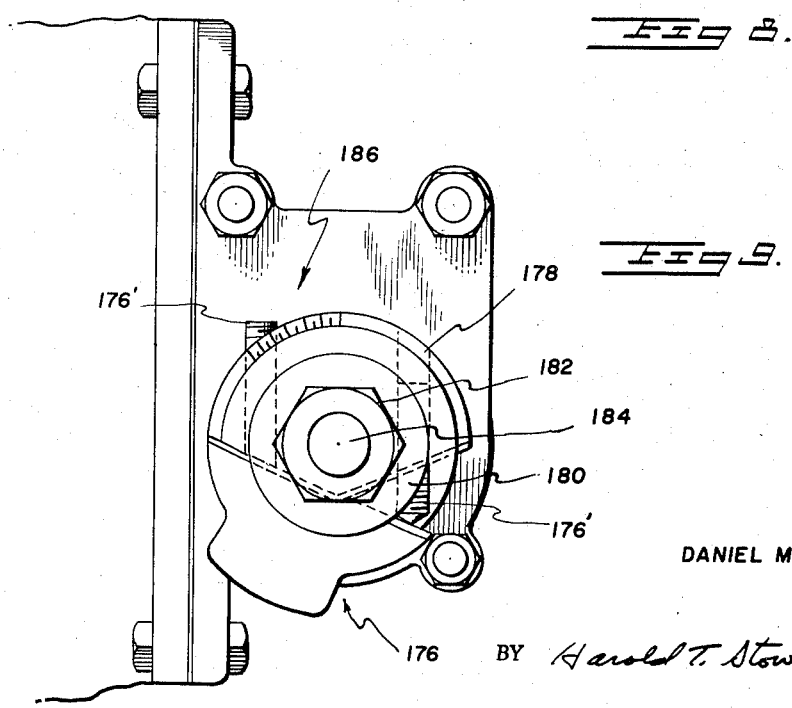
Fig. 9 is a fragmentary view substantially on line 9—9 of Fig. 8.

The power cut-off mechanism, as more clearly shown in Figs. 6-9, comprises a cam wheel 176 adjustably mounted on sleeve 178 secured to shaft 184 by means of plate 180 and nut 182. The shaft 184 has a tapered serrated outer surface which matches internal serrations in the hub of sleeve 178. For the initial setting of the cam, the sleeve 178 is removed from the shaft 184 and relocated for the approximate position on the cooperating serrations. The final fine adjustment of the cam is made by the set screws 176' carried by sleeve 178 and which bear against the cam 176. Thus by tightening one set screw and loosening the other, cam 176 is rotated on sleeve 178 as more clearly shown in Fig. 9 of the drawings. Reference indicia may be provided on the sleeve and the cam wheel as shown at 186.

The shaft 184 is drivably connected to intermediate shaft 122 through shaft 126, worm gear 188 secured thereto, and gear 190 keyed to the shaft 184. The ratio between the worm gear 188 and gear 190 is such that as the bucket moves from a forward digging position to an elevated dumping position the shaft 184 makes not more than one complete revolution.

A cam arm 192, having a cam engaging roller 194 at one end is pivotally mounted to the housing 116 by bolt 196.

A lever arm 198 is also pivotally mounted at one end to the housing by bolt 196. The lever arm 198 is bifurcated at its other end.

Furcation 202 is connected to one end of valve spool 174 by means of a slot and pin lost motion arrangement 204, while the other furcation 200 is pivotally mounted at the head end of a cylinder 206.

A cylinder 208, having a smaller bore than cylinder 206, is slidably mounted within the cylinder 206. A piston 210, slidably carried on piston rod 212, which extends axially through the piston, is slidably mounted in cylinder 206. A cap 207 screwed to the cylinder limits the travel of piston 210 in a direction away from the cylinder head. The inner end of piston rod 212 is provided with a head portion 214 which is slidably mounted within the inner cylinder 208. A coil spring 216 engages the base of the inner cylinder 208 at one end and the piston 210 at the other end and urges the piston 210 and the cylinder 208 into an extended position substantially as shown in Fig. 7 of the drawings. The outer end of piston rod 212 is pivotally connected to the cam arm 192 as at 218.

In operation of the novel bucket power cut-off mechanism, the cam wheel 176 is rotated in the direction shown by the arrow as the bucket moves from a digging to a dumping position. As the bucket approaches the dumping position, cam arm 192 is pivoted toward the cylinder 206. The initial movement of the cam arm rocks cylinder 206 and lever arm 198 downwardly which moves the valve spool 174 into a position as shown in broken lines in Fig. 7. When the spool 174 reaches its position of maximum outward travel any further movement of cam arm 192 merely compresses the spring 216 which permits the pistons 210 and 214 to slide within their respective cylinders. The pistons, cam, lever arm, and valve spool are returned by spring 216 and spring 220 at the end of spool 174 as to be more fully described hereafter.

When the shovel bucket returns from the dumping position to the digging position, cam wheel 176 rotates in a direction opposite to that shown by the arrow in Fig. 7, moving the cam arm 192 away from the spool 174. With the spool in its innermost position, as shown in the drawing, all rearward movement of the cam arm 192 is taken up coil spring 216 as the cylinder 208 is urged away from the head of cylinder 206 against the force of the spring.

The position of the bucket at the time the spool 174 cuts off power to the bucket elevating transmission may be varied as hereinbefore pointed out by merely rotating the cam wheel 176 relative to the stub shaft 126.

A cycle of operation of the bucket transmission will be described in reference to Figs. 6, 6a and 16 of the drawings.

A pump 222, driven by the prime mover 22, provides pressure fluid which is directed by conduit 166 to the valve 164. With the spool 172 in the position shown in Fig. 16, the bucket will not move as the ports controlled by this spool are closed. Thus no pressure fluid can flow to conduits 152 and 160 or to conduit 224 which connects the valve 164 and the brake actuating cylinder 226. The brake cylinder is spring urged into the "brake on" position and the brake is released by pressure fluid forcing the piston 227 into the brake release position against the force of spring 230 within the brake release cylinder.

When the spool 172 is moved outwardly from its neutral position to that position shown in Fig. 6, pressure fluid flows through conduit 224 and releases the brake 136 and a simultaneous flow of pressure fluid is directed through the internal valve passages 228 and 229. At this point the position of the valve spool 168 determines if the bucket is to be raised by means of the high speed gear 142 or the low speed gear 140.

If high speed is desired, the spool 168 is moved inwardly to the position shown in Fig. 6 and pressure fluid is directed to conduit 160 and is vented from piston 150 through conduit 152 to the valve and then through conduit 364 to the gear housing. Line 376 (Fig. 16) connects the gear housing 32 to the gear housing 16 as to be more fully described hereinafter.

If low speed is desired, the valve spool is placed in the position shown in Fig. 6a and the flow of pressure fluid in conduits 152 and 160 is reversed.

When the bucket reaches a predetermined position, the cam actuated power cut-off mechanism described above pulls valve spool 174 outwardly. When the spool 174 is in its outermost position, flow of pressure fluid through internal valve passage 229 is cut off stopping the flow of pressure fluid to the piston 150 or 158 whichever the case may be, and venting the fluid in the clutch to the sump line 364, disengaging the drive to the bucket.

In order to prevent spring 220 from immediately returning the valve spool 174 to its original position, the outward movement of the spool 174 opens the passage 232 so that pressure fluid is directed through duct 234 to the head of piston 236 which holds the spool 174 in the power off position and blocks the passage 232 to the sump line 364. With the valve spool in the above described position, the bucket is free to return to the digging position by gravity.

The cam arm 192 and cam roller 194 are also held away from cam 176, so that as the bucket returns by gravity to the digging position and the cam turns in the opposite direction to the arrow shown, plunger spool 174 cannot follow the cam movement and return pressure to the bucket clutch. The piston 236 holds the spool 174 out, permitting the bucket to fall freely to the digging position.

In order to permit valve spool 174 to return to the position shown in Figs. 6, 6a and 16, valve spool 172 is moved to its maximum inward or "bucket down" position or to the center or "bucket hold" position. With spool 172 in either of these positions, the flow of pressure fluid to the internal valve passage 229 is cut off which prevents the flow of pressure fluid through duct 234 to the head of piston 236, thus permitting spring 220 to return valve spool 174 to its normal position. The bucket may then be raised again by moving spool 174 out to the "bucket up" position.

From the foregoing description of the bucket transmission, it will be seen that the bucket brake mechanism is automatically applied when the bucket control spool 172 is released by the operator. The centering spring 172' returns the spool 172 to the neutral position and in this position the pressure to the bucket brake cylinder 227 is evacuated and the springs immediately apply to the brake, holding the bucket with its load. Since the bucket brake is released by fluid pressure, it has been found that it is convenient to have a manual brake release in case a hydraulic line should break or if the prime mover should fail while the bucket is in the up position. In order to accomplish the manual release of the brake, levers 117 and 119 are suitably connected to a brake release handle not shown in the drawings.

The two speed bucket transmission provides a further multiplication of the torque advantage obtained by the combination of chain reels and rocker arm shape. Extremely high digging force may be obtained in low gear when the bucket is down in the digging position. As the bucket is moving over to the discharge position, the operator may change the transmission to high speed without dropping the load or slowing down the travel of the bucket. The high speed drive then gives the maximum discharge velocity to the bucket to throw the load a substantial distance. However, if desired, the bucket may be left in the low speed range and the bucket will discharge slowly for placing the load close to the rear of the machine.

The constant mesh hydraulically controlled transmission 16 for the crawler tracks will be particularly described with reference to Figs. 10 through 16 of the drawings. Journalled in the housing in the forward section 10 of the main frame, are shafts 240, 242, 244, 246, 248, 250 and 252.

The prime mover 20 is connected in driving relationship to shaft 242, through the conventional hydraulic fluid type torque converter 22, and the universal coupling 34.

Shaft 242 has keyed thereto two gears 254, and 256. Gear 254 is the high speed gear and gear 256 is the low speed gear, as to be further described hereinafter.

Stub shaft 240 is driven by gear 256 through gear 256' keyed to the shaft. The stub shaft provides a front power take-off to drive various tractor attachments as is well known in the art. The teeth of gear 256 also engage the teeth of gear 258 which gear is rotatably mounted on shaft 248, the high-speed low-speed shaft of the transmission.

Alternate radially extending clutch discs of multiple disc clutch 260 are secured to the annular extension 262 which rotates with gear 258. The other discs of clutch 260 are secured to the clutch housing 264 which in turn is secured to and rotates with shaft 248.

Within the clutch housing is a ring shaped piston 266 carrying a presser plate 266' spring urged out of engagement with the clutch discs by spring 268. To actuate the clutch 260 so that the shaft 248 is driven through gears 256 and 258 pressure fluid is directed to the head of piston 266 through a conduit 270, a portion of which is provided by an internal passage in the shaft 248.

In Fig. 14 of the drawing, this clutch is shown in the engaged position, while in Fig. 15, this clutch is shown disengaged permitting the gear 258 to turn freely on the shaft 248.

Gear 254 of shaft 242 drivably engages gear 272 which like gear 258 is rotatably mounted on shaft 248. Alternate radially extending clutch discs of multiple disc clutch 274 are secured to the annular extension 276 which rotates with gear 272. The other discs of clutch 274 are secured to the clutch housing 278 which in turn is secured to and rotates with shaft 248.

Within the clutch housing is a ring shaped piston 280 carrying a presser plate 280' spring urged out of engagement with the clutch discs by spring 282. To actuate the clutch 274 so that shaft 248 is driven through gears 254 and 272 pressure fluid is directed to the head of piston 280 through a conduit 284, a portion of which is provided by an internal passage in the shaft 248. In Fig. 14 of the drawings, this clutch is shown in the disengaged position, while in Fig. 15, it is shown engaged whereby shaft 248 is rotated at a higher speed than when clutch 260 is engaged. Since clutch 274 is the high-speed low-torque clutch the number of pairs of discs in this clutch are less than those shown in the low-speed high-torque clutch 258.

A gear 401 on shaft 242 drives a governor generally designated 286. The governor is connected by arm 287 and link 287' to valve spool 344 of valve 342, which will be described hereinafter. The governor is provided to automatically shift the transmission from high gear to low gear or vice-versa depending upon the speed of rotation of the power input shaft. Therefore the governor merely keeps the output of the torque converter within an efficient range on installations employing a torque converter.

In addition to the gears 272 and 258 rotatably mounted on shaft 248, this shaft also carried gears 286 and 288 which are keyed thereto. Each of these gears is drivably connected to each of the shafts 246 and 252. Shaft 246 is connected through universal coupling 290 to torque shaft 26 which in turn is connected to final drive 30 through universal coupling 292, brake assembly 294, and pinion shaft 64'. The other final drive 28 is connected to the complementary transmission shaft 252 through pinion shaft 64, brake assembly 296, universal coupling 298, torque shaft 24, and universal coupling 300.

Gear 288 of shaft 248 is in constant mesh with gears 302 and 304 rotatably mounted on their respective shafts 246 and 252.

Alternate radially extending clutch discs of multiple disc clutch 306 are secured to the annular extension 308 which rotates with gear 302. The other discs of clutch 306 are secured to the clutch housing 310 which is secured to and rotates with shaft 246. Within the housing is a ring shaped piston 312 carrying a presser plate 313 spring urged out of engagement with the clutch discs by spring 314.

To actuate the clutch 306 so that shaft 246 is driven through gears 288 and 302 pressure fluid is directed to the head of piston 312 through a conduit 316, a portion of which is provided by an internal passage in the shaft 246. Since the normal direction of rotation of shafts 242 and 248 is as shown by the arrows in Fig. 11, gear 302 and its associated clutch 306 are the forward drive unit for final drive 30.

Gear 304 is drivably connected to shaft 252 in the same manner as described with reference to gear 302 and corresponding parts are given primed reference numerals. The only distinction between these two groups of mechanisms is that while clutch 306 is the forward drive clutch for shaft 246, clutch 306' is the reverse drive clutch for shaft 252. Therefore, in Fig. 14 showing this portion of the transmission, the forward clutch 306 is shown in the engaged position and clutch 306' in the disengaged position.

Gear 286 of shaft 248 is drivably connected to gear 318 rotatably mounted on shaft 246, through idler gear 320 carried by the stub shaft 244. Gear 286 is similarly connected to gear 318', rotatably mounted on shaft 252, through idler 322 carried by the stub shaft 250. The diameters of gears 318 and 318' and gear 286 is of the same ratio as gears 302 and 304 and gear 288, whereby shafts 246 and 252 rotate at the same speed whether driven by gear 288 or gear 286, the two sets of gears being provided so that a reverse direction of rotation of shafts 246 and 252 may be obtained.

Alternate radially extending clutch discs of multiple disc clutch 324 are secured to the annular extension 326 which rotates with gear 318. The other discs of clutch 324 are secured to the clutch housing 328 secured to and rotatable with shaft 246. Within the clutch housing 328 is a ring shaped piston 330 carrying a presser plate 331 spring urged out of engagement with the clutch discs by spring 332.

To actuate the clutch 324 so that shaft 246 is driven through gears 286, 320 and 318, pressure fluid is directed to the head of piston 330 through a conduit 334, a portion of which is provided by an internal passage in the shaft 246.

Gear 318' is drivably connected to shaft 252 in the same manner as described with reference to gear 318 and shaft 246, and corresponding parts not specifically described hereinbefore, are given primed reference numerals.

The operation of the crawler transmission will be described with reference in particular to Figs. 14, 15 and 16. Fig. 16 is a diagrammatic hydraulic flow diagram of the invention, Fig. 14 shows the transmission in forward low-speed gear and Fig. 15 shows the transmission in reverse high-speed gear.

Pressure fluid for operation of the crawler transmission is obtained from the pump 222, which pump, as hereinbefore described, supplies the pressure fluid for the bucket transmission 32.

Pressure fluid is conducted from pump 222 through conduit 340 to crawler control valve 342. Valve 342 is a three-spool valve. Valve spool 344 is the high-speed low-speed spool and controls the flow of pressure fluid within conduits 270 and 284. The valve spool 344 is shown in the neutral position so that the flow of pressure flow from internal valve passage 346 is blocked from entering into either conduit 270 or 284, and conduits 270 and 284 are connected to the sump through line 354 so that clutches 260 and 274 are disengaged. Spring urged detents generally indicated 348 hold the valve spool in the neutral, high or low speed positions.

Valve spools 350 and 352 are the right and left crawler control spools and control flow of pressure fluid in conduits 316 and 334 and 316' and 334', respectively. Each of the spools 350 and 352 is also a three-position spool and each is shown in the neutral position whereby the flow of pressure fluid from internal valve passage 346 is blocked from flowing to conduits 316, 316', 334 and 334'. However, each of said conduits is connected to the sump line 354 when the valve spools are in the neutral position. Spring urged detents generally indicated 356 and 358 for spools 350 and 352, respectively, hold the spools in the neutral position, while valve spool springs 360 and 362, respectively, urge the spools into the neutral position from their forward drive or reverse drive positions. The sump line 354, like sump line 364 from the valve 164 of the bucket transmission connects into the lower section of the crawler transmission housing 16.

From the foregoing description of the crawler transmission, it will be seen that the machine operator by merely manipulating valve spools 344, 350 and 352 of crawler control valve 342 the heavy material handling machine may be run forward or backward at high or low speed, or one of the crawlers may be driven forward while the other is going in the reverse direction or one crawler can be held in the neutral position while the other is driven either forward or backward at high or low speed. It will also be evident that with the constant mesh drive any of these drive combinations may be effected one after the other with great rapidity without damage to the drive mechanism, thus providing a sensitive control for heavy earth moving equipment heretofore unrealized, and that the change from low to high speed may be made without loss of speed or momentum and while transmitting full torque.

Pump 222, besides supplying pressure fluid for the operation of the crawler and bucket transmission, also supplies pressure fluid for the tractor torque converter 22, and lubricant for the crawler and bucket transmissions as now to be described in reference in particular to Fig. 16.

A portion of the pressure fluid from the pump 222, which supplies fluid at a pressure of about 130 pounds per square inch, passes through a conventional reducing valve 366 to supply pressure at 70 pounds per square inch for the torque converter 22. The excess of pressure fluid supplied to the torque converter is filtered by filter 370, provided with a by-pass valve 372 normally set to open at a pressure of 20 pounds per square inch.

From filter 370, pressure fluid for lubrication is conducted by conduit 374 to line 162, a portion of which, as hereinbefore described, is provided by an internal passage in shaft 144 of the bucket transmission. The lubrication after seeping through the bearings, clutch discs and the like is conducted by sump line 376 to the housing of the crawler transmission 16.

Lubrication conduit 374 also connects to lubrication line 378, having branch lines 380, 382 and 384.

A portion of lines 380, 382 and 384 are provided by internal passages in shafts 248, 246 and 252, as more clearly shown in Figs. 14 and 15 of the drawings. From conduits 380, 382 and 384 the lubricant is forced through the bearings and clutches and about the gears of the transmission 16, from which it drains into the lowermost portion of the transmission casing. The pump 222 sucks the liquid therefrom through conduit 386 and filter 388. Branch line 403 connectes line 378 to the housing 16 of the transmission through relief valve 402 set to open at about 10 pounds per square inch. This relief valve maintains a pressure of 10 pounds per square inch in lines 162, 380, 382 and 384 to assure complete lubrication of the internal clutch parts and bearings.

From the foregoing description, it will be seen that the present material handling machine presents a basically new mechanical development in the heavy earth moving machinery class whereby the aims, objects and advantages of the invention are fully accomplished.

While only a preferred embodiment of the present invention has been described in detail with reference to the drawings, it will be evident to those skilled in the art that various modifications may be made in the various components of the machine as defined in the appended claims.

I claim:

1. A mobile material handling machine having a sectional main frame comprising a front part carrying a traction unit transmission, a center part removably secured at its forward end to the front part, a motor mounted in said center part and drivably connected to the traction unit transmission in the front part, a rear part removably secured to the center part, said rear part including a pair of transversely spaced final drive housings and a transverse spacer frame between said final drive housings, opposed final drives for the traction unit in said final drive housings, at least one torque shaft, and means drivably connecting the torque shaft to the traction unit transmission at one end and the final drives at the other end.

2. A mobile material handling machine having a sectional main frame comprising a front part carrying a traction unit transmission, a center part removably secured at its forward end to the front part, a motor mounted in said center part and drivably connected to the traction unit transmission in the front part, a rear part removably secured to the center part, said rear part comprising a pair of transversely spaced final drive housings removably connected to the rearward end of the center section, and a transverse spacer frame between said final drive housings, opposed final drive units in each of the final drive housings, torque shafts extending through the center part, and means drivably connecting the torque shafts to the traction unit transmission at one end and to the final drives at the other end.

3. The invention defined in claim 1 including a second transmission carried by the transverse spacer frame and drivably connected to said motor in the center part and having connection with a material handling device.

4. The invention defined in claim 2 including a second transmission carried by the transverse spacer frame, a rear power take-off from said motor in the center part and means drivably connecting the rear power take-off and said second transmission.

References Cited in the file of this patent
UNITED STATES PATENTS

| | | |
|---|---|---|
| 1,058,546 | Campbell | Apr. 18, 1913 |
| 1,270,826 | Houghton | July 2, 1918 |
| 1,423,642 | Beal | July 25, 1922 |
| 1,438,414 | Voegeli | Dec. 12, 1922 |
| 1,481,405 | Anglada | Jan. 22, 1924 |
| 2,084,887 | Bennett | June 22, 1937 |
| 2,207,904 | Ward | July 16, 1940 |
| 2,287,438 | Lindsay | June 23, 1942 |
| 2,295,896 | Grater | Sept. 15, 1942 |
| 2,352,086 | Eberhard | June 20, 1944 |
| 2,399,733 | Hagen | May 7, 1946 |
| 2,425,948 | Lucien | Aug. 19, 1947 |
| 2,448,662 | Dale | Sept. 7, 1948 |
| 2,483,473 | Passelegue | Oct. 4, 1949 |
| 2,495,057 | Dillingham | Jan. 17, 1950 |
| 2,495,138 | Royle | Jan. 17, 1950 |
| 2,579,888 | Watt | Dec. 25, 1951 |
| 2,613,006 | Bradford | Oct. 7, 1952 |
| 2,651,378 | De La Llana | Sept. 8, 1953 |

FOREIGN PATENTS

| | | |
|---|---|---|
| 148,365 | Great Britain | Nov. 25, 1920 |